Feb. 3, 1931.  F. P. GATES  1,790,747
SWITCH AND GROUND PLUG
Filed March 8, 1928  2 Sheets-Sheet 1
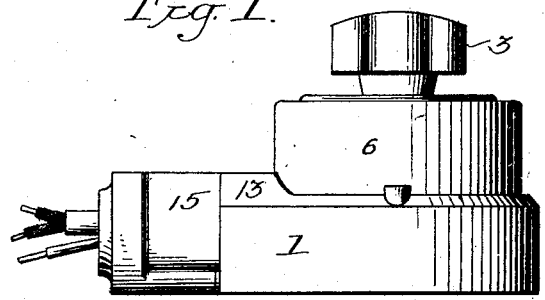
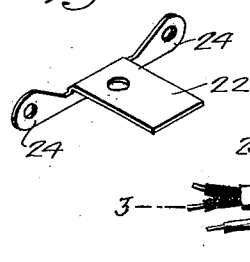
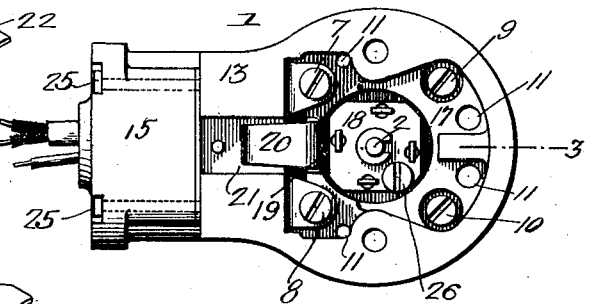
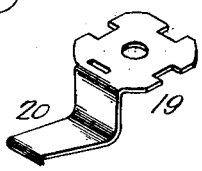
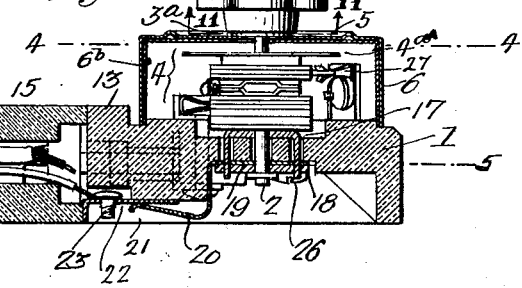
Inventor,
Frederic P. Gates
by his Attorneys,
Howson & Howson

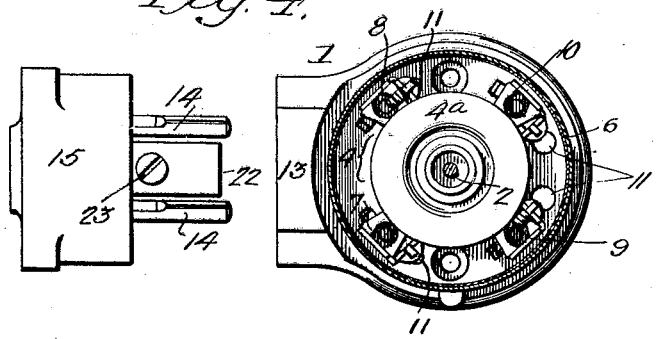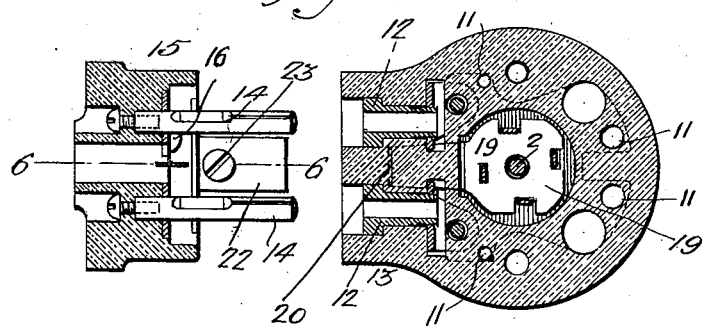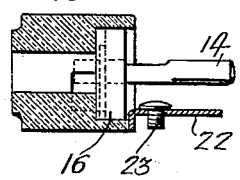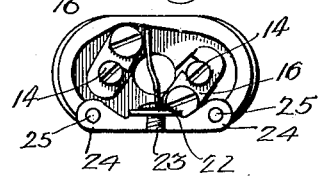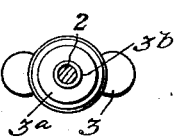

Patented Feb. 3, 1931

1,790,747

UNITED STATES PATENT OFFICE

FREDERIC P. GATES, OF WEST HARTFORD, CONNECTICUT, ASSIGNOR, BY MESNE ASSIGNMENTS, TO THE ARROW-HART & HEGEMAN ELECTRIC COMPANY, OF HARTFORD, CONNECTICUT, A CORPORATION OF CONNECTICUT

SWITCH AND GROUND PLUG

Application filed March 8, 1928. Serial No. 260,132.

The object of my invention is to provide a ground for a device plugged into a switch and also to ground the operating parts of a switch and its casing. This object I attain by providing a plug with a tongue to which the ground wire is attached and which will bear upon a contact plate in the switch proper when the plug is inserted in the socket of the switch structure.

In the accompanying drawings:

Fig. 1 is a switch structure and plug embodying my invention;

Fig. 2 is an inverted plan view;

Fig. 3 is a sectional view on the line 3—3, Fig. 2;

Fig. 4 is a sectional plan view on the line 4—4, Fig. 3, with the plug withdrawn;

Fig. 5 is a sectional view on the line 5—5, Fig. 3, with the plug withdrawn;

Fig. 6 is a sectional view of the plug on the line 6—6, Fig. 5;

Fig. 7 is an end view of the plug;

Fig. 8 is a detached perspective view of the ground blade of the plug;

Fig. 9 is a detached perspective view of the ground plate of the switch; and

Fig. 10 is a detached perspective view of one of the terminal sockets of the switch.

Fig. 11 is a sectional view taken on line 11—11 of Fig. 3.

Referring to the drawings, 1 is the base of a switch structure made of porcelain or other non-conducting material.

2 is a stem having a handle 3 at its outer end and 4 is a switch mechanism of any suitable type.

4a is an indicator plate, the indicating marks of which can be seen through an opening 5 in the casing 6 which encloses the operating mechanism. The casing is connected electrically with a ground plate through a washer 3a and threaded metallic stem 3b in the handle, which is mounted upon the spindle, the washer being in contact with the metallic casing as shown in Fig. 3.

There are four terminals 7, 8, 9 and 10. Each terminal contains a threaded post on which are mounted spring contact plates and a binding screw to which the wires are attached. These wires extend through holes 11 in the body portion. Two of the posts, 7 and 8, are connected to plug sockets 12 located in an extension 13 of the base 1 and are arranged to receive the terminals 14 of a plug 15, the terminals having binding screws 16 to which the wires are attached.

17 and 18 are two plates, one mounted on one side of the porcelain center and the other on the opposite side. The plate 17 has arms which extend through openings in the base and in the plate 18. This is an ordinary construction, but I locate a ground plate 19 between the plate 18 and the base 1, as shown in Fig. 3, this ground plate having a spring tongue 20 which is located in a recess 21 in the extension 13 of the base and is so positioned that, when the plug is inserted in the base, a blade 22 secured to the plug comes in contact with the tongue. On the blade is a binding screw 23 to which the ground wire is attached so that, when the plug is in position, the operating parts of the switch, as well as the casing, are grounded through the tongue 20 and the blade 22.

The blade 22, in the present instance, has wings 24 which are attached by screws 25 to the plug, but other means of fastening the blade to the plug may be used without departing from the essential features of my invention.

On the plate 18 is a ground binding-screw 26 to which a ground wire can be attached to ground the switch.

The blades 27 of the switch mechanism are insulated from the stem and other parts of the switch mechanism, while the inner surface of the casing is preferably coated with an insulating material 6b.

By the arrangement described above, the ground wire may be attached to the binding-screw on the blade 22 carried by the plug 15, or it may be attached to the binding-screw on the ground plate 19. In either case, the switch casing 6 is grounded through the washer 3a, stem 2, and the ground plate 19.

While I have described certain means for grounding the casing, other means may be used without departing from the essential features of the invention.

I claim:

1. The combination in a switch structure, of an insulating base; a switch mechanism including an operating handle and a spindle mounted on said base; a plug for engaging said switch mechanism; a casing enclosing the said mechanism with the exception of the handle and in contact with said spindle; and means for grounding said spindle, said casing and said plug comprising a blade in said plug arranged to contact with a tongue in said base having a direct connection with said casing through said spindle.

2. The combination in a switch structure, of an insulating base; switch-operating mechanism thereon having a stem provided with an operating handle for actuating said mechanism; a casing enclosing said mechanism, terminal sockets in said base adjacent said switch mechanism and electrically connected thereto; a ground plate in contact with said stem; a plug having contact members arranged to enter said sockets; and a ground blade carried by the plug and arranged to come in contact with the ground plate when the contact members of the plug are in position in the sockets of the switch structure whereby said stem, casing and plug are grounded.

3. The combination in a switch structure, of an insulating base; switch-operating mechanism on said base including a spindle extending into said base; a casing enclosing said switch mechanism and in electrical contact with said spindle; a blade having means for connecting a ground thereto including a ground plate clamped between said first-mentioned plate and the base and provided with a projecting tongue; terminal sockets in said base adjacent said switch mechanism and electrically connected thereto; a plug having contact members arranged to enter said sockets; and a ground blade carried by said plug and arranged to come in contact with said projecting tongue when the contact members are in position in the sockets of the switch structure, said blade having means for connecting it to a ground wire whereby the spindle, the casing and the plug are effectively grounded.

FREDERIC P. GATES.